United States Patent
Honda et al.

(10) Patent No.: US 10,608,482 B2
(45) Date of Patent: Mar. 31, 2020

(54) METHOD OF MANUFACTURING STATOR CORE, METHOD OF INSPECTING STATOR CORE, STATOR CORE, AND MOTOR

(71) Applicant: Nidec Corporation, Kyoto (JP)

(72) Inventors: Takeshi Honda, Kyoto (JP); Hiroshi Kitagaki, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 171 days.

(21) Appl. No.: 15/737,875

(22) PCT Filed: Jun. 17, 2016

(86) PCT No.: PCT/JP2016/068055
§ 371 (c)(1),
(2) Date: Dec. 19, 2017

(87) PCT Pub. No.: WO2016/204263
PCT Pub. Date: Dec. 22, 2016

(65) Prior Publication Data
US 2019/0013705 A1    Jan. 10, 2019

(30) Foreign Application Priority Data

Jun. 19, 2015 (JP) .................. 2015-123826

(51) Int. Cl.
*H02K 1/18* (2006.01)
*H02K 15/02* (2006.01)
*H02K 1/14* (2006.01)

(52) U.S. Cl.
CPC .............. *H02K 1/18* (2013.01); *H02K 1/148* (2013.01); *H02K 15/02* (2013.01); *H02K 15/022* (2013.01)

(58) Field of Classification Search
CPC .......... H02K 1/18; H02K 1/148; H02K 15/02; H02K 15/022; H02K 15/024; H02K 15/026; H02K 15/028
(Continued)

(56) References Cited

U.S. PATENT DOCUMENTS 7,382,075 B2    6/2008  Wang et al.
7,414,347 B2    8/2008  Wang et al.
(Continued)

FOREIGN PATENT DOCUMENTS

JP    09-19112 A    1/1997
JP    10-201151 A    7/1998
(Continued)

OTHER PUBLICATIONS

Omura Kazuya; Tsugei Tokuo, Stator Core for Motor and Manufacture Method, Apr. 21, 2005, Mitsubishi Electric Corp, JP 2005110464 (English Machine Translation) (Year: 2005).*
(Continued)

*Primary Examiner* — Jermele M Hollington
*Assistant Examiner* — Alexander A Singh
(74) *Attorney, Agent, or Firm* — Keating & Bennett

(57) ABSTRACT

A method of manufacturing a stator core, the stator core that includes core pieces arranged in a circumferential direction about a central axis that extends in an up-down direction, the core pieces formed by stacking plate members, the plate members each including a core back portion extending in the circumferential direction, a tooth portion extending from the core back portion towards a first side in a radial direction, and a groove portion recessed from a surface on a second side of the core back portion in the radial direction towards the first side in the radial direction, the method of manufacturing the stator core including stamping out an individual piece including the core back portion and the tooth (Continued)

portion stamped out from an electromagnetic steel sheet, and forming the groove portion formed by punching a portion of the electromagnetic steel sheet.

20 Claims, 8 Drawing Sheets

(58) Field of Classification Search
USPC .......................................................... 29/596
See application file for complete search history.

(56) References Cited

U.S. PATENT DOCUMENTS

| | | |
|---|---|---|
| 7,586,231 B2 | 9/2009 | Wang et al. |
| 2005/0212377 A1 | 9/2005 | Wang et al. |
| 2009/0026873 A1 | 1/2009 | Matsuo et al. |
| 2014/0139065 A1* | 5/2014 | Yamada .................. H02K 21/16 |
| | | 310/156.66 |

FOREIGN PATENT DOCUMENTS

| | | | |
|---|---|---|---|
| JP | 2005-110464 A | | 4/2005 |
| JP | 2005110464 A | * | 4/2005 |

OTHER PUBLICATIONS

Official Communication issued in International Patent Application No. PCT/JP2016/068055, dated Sep. 6, 2016.

* cited by examiner

METHOD OF MANUFACTURING STATOR CORE, METHOD OF INSPECTING STATOR CORE, STATOR CORE, AND MOTOR

BACKGROUND OF THE INVENTION

1. Field of Invention

The present invention relates to a method of manufacturing a stator core, a method of inspecting the stator core, the stator core, and a motor.

2. Description of the Related Art

For example, Japanese Unexamined Patent Application Publication No. 9-19112 describes a split core used in a stator of a rotary electric machine. A recess for positioning purpose is provided in the split core on the outside diameter side.

As a method of manufacturing the split core described above, a method can be cited in which plate members having an outer periphery of the split core are stamped out from an electromagnetic steel sheet, and the plate members that have been stamped out are stacked. In a case in which the above method is used, the dimensional accuracy of the outer periphery of the split core is the same throughout the entire outer periphery.

Incidentally, compared with other portions, a high dimensional accuracy is required in the recesses (the groove portions) of the split core that are used for positioning. However, in the method described above in which the plate members having the outer periphery of the split core are merely stamped out from the electromagnetic steel sheet, when a stamping-out accuracy decreases, the dimensional accuracy of the recesses decreases together with the other portions. Accordingly, there has been a problem in that the accuracy of the positioning of the split cores decreases. With the above, there is a concern of a distortion occurring in the magnetic path generated in the stator core constituted by a plurality of split cores. When the magnetic path generated in the stator core becomes distorted, a problem in that cogging torque and torque ripple of the motor become large is encountered.

The above problem is not limited to split cores and is similar in straight cores in which a plurality of core pieces are connected. In a case of a straight core, a member in which a plurality of core pieces are connected are folded into an annular shape, and the plurality of core pieces are arranged in the circumferential direction. In the above case, if the dimensional accuracy of the recesses that are provided in core pieces and that are used for positioning is low, a problem is encountered in that the positioning accuracy of the core pieces becomes decreased.

SUMMARY OF THE INVENTION

In view of the problem described above, an object of an aspect of the present invention is to provide a method of manufacturing a stator core that is capable of suppressing decrease in the dimensional accuracy of the groove portions used in positioning, and a method of inspecting such a stator core manufactured using such a manufacturing method. Furthermore, an object of an aspect of the present invention is to provide a stator core that is manufactured using the method of manufacturing a stator core that is capable of suppressing decrease in the dimensional accuracy of the groove portions used in positioning, and a motor that includes such a stator core.

An aspect of a method of manufacturing a stator core of the present invention, in which the stator core includes a plurality of core pieces arranged in a circumferential direction about a central axis, serving as a center, that extends in an up-down direction, the plurality of core pieces formed by stacking a plurality of plate members, the plate members each including a core back portion that extends in the circumferential direction, a tooth portion that extends from the core back portion towards a first side in a radial direction, and a groove portion that is recessed from a surface on a second side of the core back portion in the radial direction towards the first side in the radial direction, the method of manufacturing the stator core including stamping out an individual piece, in which the individual piece including the core back portion and the tooth portion is stamped out from an electromagnetic steel sheet, and forming the groove portion, in which the groove portion is formed by punching a portion of the electromagnetic steel sheet.

According to an aspect of the present invention, a method of manufacturing a stator core that is capable of suppressing decrease in the dimensional accuracy of the groove portions used in positioning, and a method of inspecting such a stator core manufactured using such a manufacturing method are provided. Furthermore, according to an aspect of the present invention, a stator core that is manufactured using the method of manufacturing a stator core that is capable of suppressing decrease in the dimensional accuracy of the groove portions used in positioning, and a motor that includes such a stator core are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
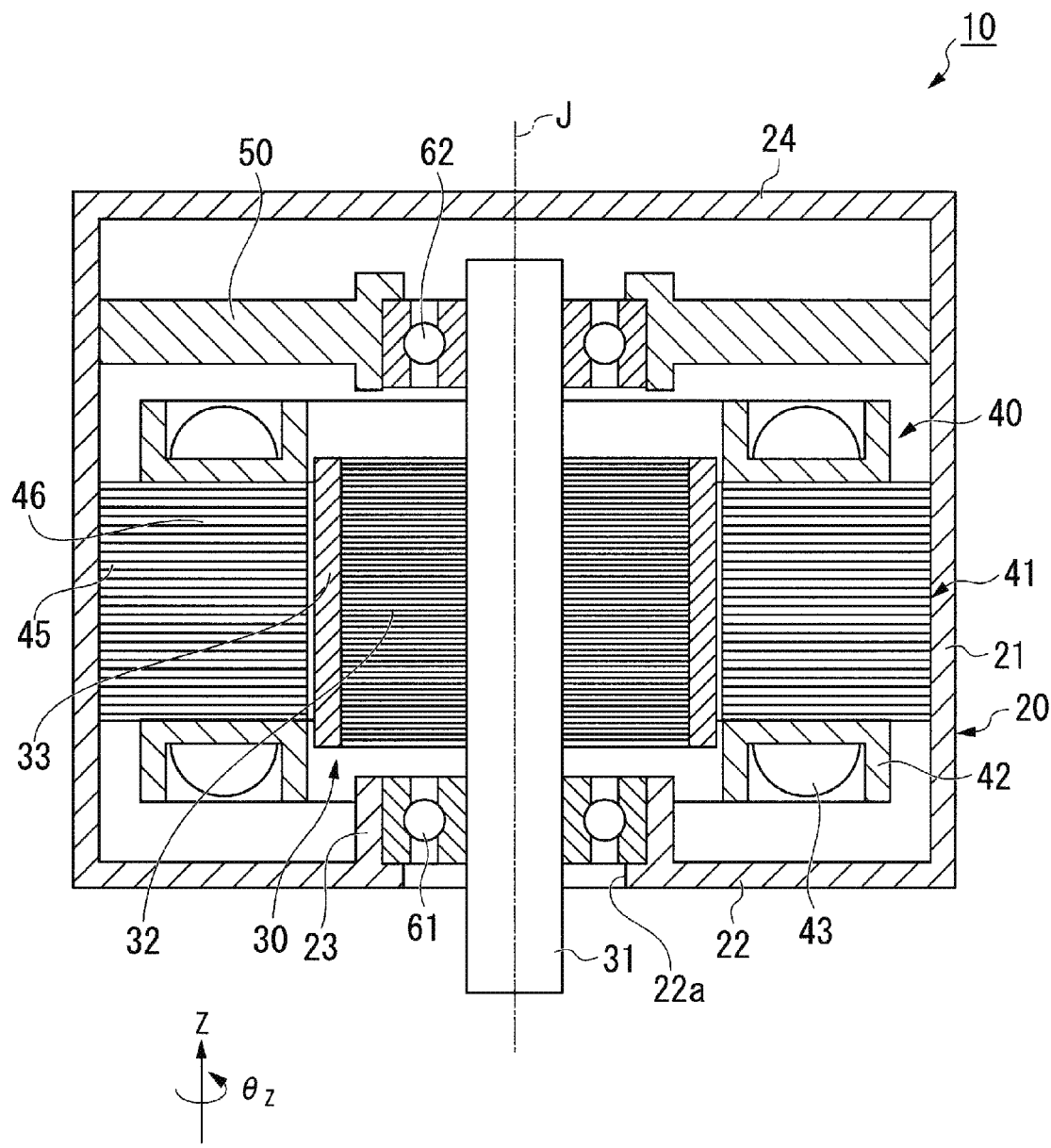
FIG. 1 is a cross-sectional view illustrating a motor of a present embodiment.

Hereinafter, referring to the drawings, a motor and a method of manufacturing a stator core according to an embodiment of the present invention will be described. Note that the scope of the present invention is not limited to the embodiment below and can be changed in any manner within the scope of the technical idea of the present invention. Furthermore, in the drawings hereinafter, the scales, the numbers, and the like may be different from the scales, the numbers, and the like in the actual structures in order to facilitate understanding of the configurations.

Furthermore, the Z-axis will be appropriately illustrated in the drawings. A Z-axis direction is a direction parallel to an axial direction of a central axis J illustrated in FIG. 1. Furthermore, in the description hereinafter, the direction in which the central axis J extends is referred to as an up-down direction (the Z-axis direction). A positive side (+Z side) of the Z-axis direction is referred to as an "upper side", and a negative side (−Z side) of the Z-axis direction is referred to as a "lower side". Note that the up-down direction, the upper side, and the lower side are terms that are used merely for description and do not limit the actual positional relationships and the actual directions. Furthermore, unless otherwise stated, a direction (the Z axis direction) parallel to a central axis J is merely referred to as an "axial direction", a radial direction having the central axis J as the center is merely referred to as a "radial direction", and a circumferential direction (a θZ direction) about the central axis J, in other words, around the central axis J, is merely referred to as a "circumferential direction".

Note that in the present specification, extending in the axial direction includes, in addition to a case extending strictly in the axial direction, a case extending in a direction inclined by less than 45° against the axial direction. Furthermore, in the present specification, extending in the radial direction includes, in addition to a case extending strictly in the radial direction, in other words, in a direction perpendicular to the axial direction, a case extending in a direction inclined by less than 45° against the radial direction.

FIG. 1 is a cross-sectional view illustrating a motor 10 of the present embodiment. As illustrated in FIG. 1, the motor 10 includes a housing 20, a rotor 30, a stator 40, an upper side bearing holder 50, a lower side bearing (a bearing) 61, and an upper side bearing (a bearing) 62.

The housing 20 houses the rotor 30, the stator 40, the upper side bearing holder 50, the lower side bearing 61, and the upper side bearing 62. The housing 20 includes a housing cylindrical portion 21, a housing bottom plate portion 22, a lower side bearing holding portion 23, and a housing top plate portion 24.

The housing cylindrical portion 21 has a tubular shape that surrounds the stator 40 in the circumferential direction. The housing bottom plate portion 22 is connected to a lower side end portion of the housing cylindrical portion 21. The housing bottom plate portion 22 covers a lower side of the stator 40. The housing bottom plate portion 22 includes an output shaft hole 22a that penetrates the housing bottom plate portion 22 in the axial direction. The output shaft hole 22a is positioned at the center of the housing bottom plate portion 22.

The lower side bearing holding portion 23 has a tubular shape that projects towards the upper side from the housing bottom plate portion 22. The lower side bearing holding portion 23 is positioned outside of the output shaft hole 22a in the radial direction. The lower side bearing 61 is held inner side the lower side bearing holding portion 23 in the radial direction. The housing bottom plate portion 24 is connected to an upper side end portion of the housing cylindrical portion 21. The housing top plate portion 24 covers the upper sides of the rotor 30, the stator 40, and the upper side bearing holder 50.

The rotor 30 includes a shaft 31, a rotor core 32, and a rotor magnet 33. The central axis J extending in the up-direction serves as a center of the shaft 31. A lower side end portion of the shaft 31 projects to an outside portion of the housing 20 through the output shaft hole 22a.

The rotor core 32 is fixed to an outer peripheral surface of the shaft 31. The rotor magnet 33 is fixed to an outer peripheral surface of the rotor core 32. The shaft 31, the rotor core 32, and the rotor magnet 33 all rotate about the central axis (±θZ direction).

The lower side bearing 61 and the upper side bearing 62 are bearings that support the shaft 31. The lower side bearing 61 and the upper side bearing 62 support the shaft 31 to be rotatable about the central axis J (±θZ direction). The lower side bearing 61 is positioned on the lower side with respect to the stator 40. The lower side bearing 61 is held by the lower side bearing holding portion 23. The upper side bearing 62 is positioned on the upper side with respect to the stator 40. The upper side bearing 62 is held by the upper side bearing holder 50.

The upper side bearing holder 50 is positioned on the upper side with respect to the stator 40. The upper side bearing holder 50 is fixed to an inner circumferential surface of the housing cylindrical portion 21. The upper side bearing holder 50 holds the upper side bearing 62.

The stator 40 is positioned on the outside of the rotor 30 in the radial direction. The stator 40 includes a stator core 41, an insulator 42, and a coil 43. The insulator 42 is mounted on described-later teeth 46 of the stator core 41. The coil 43 is wound around the teeth 46 with the insulator 42 interposed therebetween.

Figure 2:
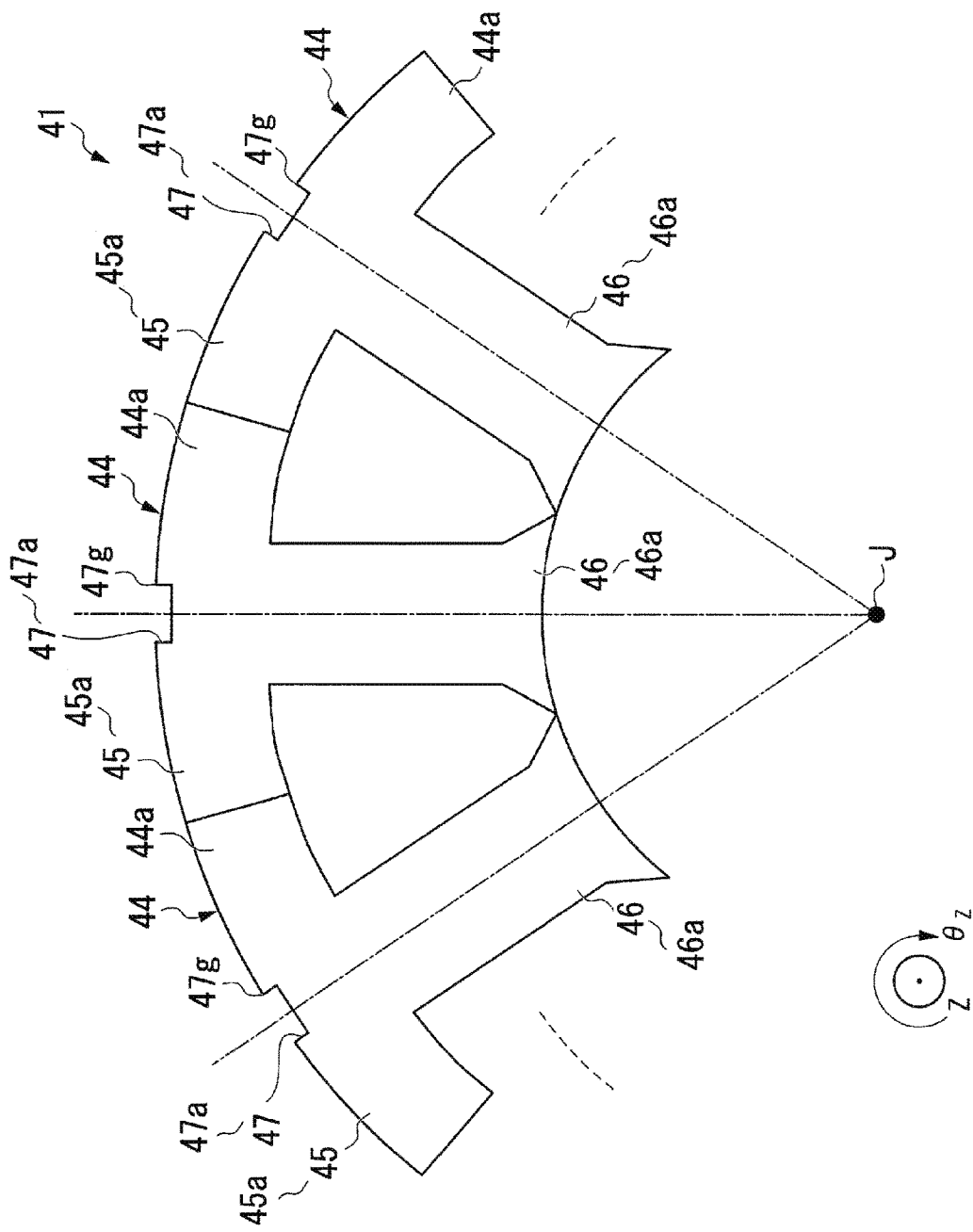
FIG. 2 is a plan view illustrating a stator core of the present embodiment.

FIG. 2 is a plan view illustrating the stator core 41. As illustrated in FIG. 2, the stator core 41 includes a plurality of core pieces 44. The plurality of core pieces 44 are arranged in the circumferential direction about the central axis J extending in the up-down direction. The core pieces 44 are separate members with respect each other, for example. In other words, the stator core 41 is formed of split cores.

Figure 3:
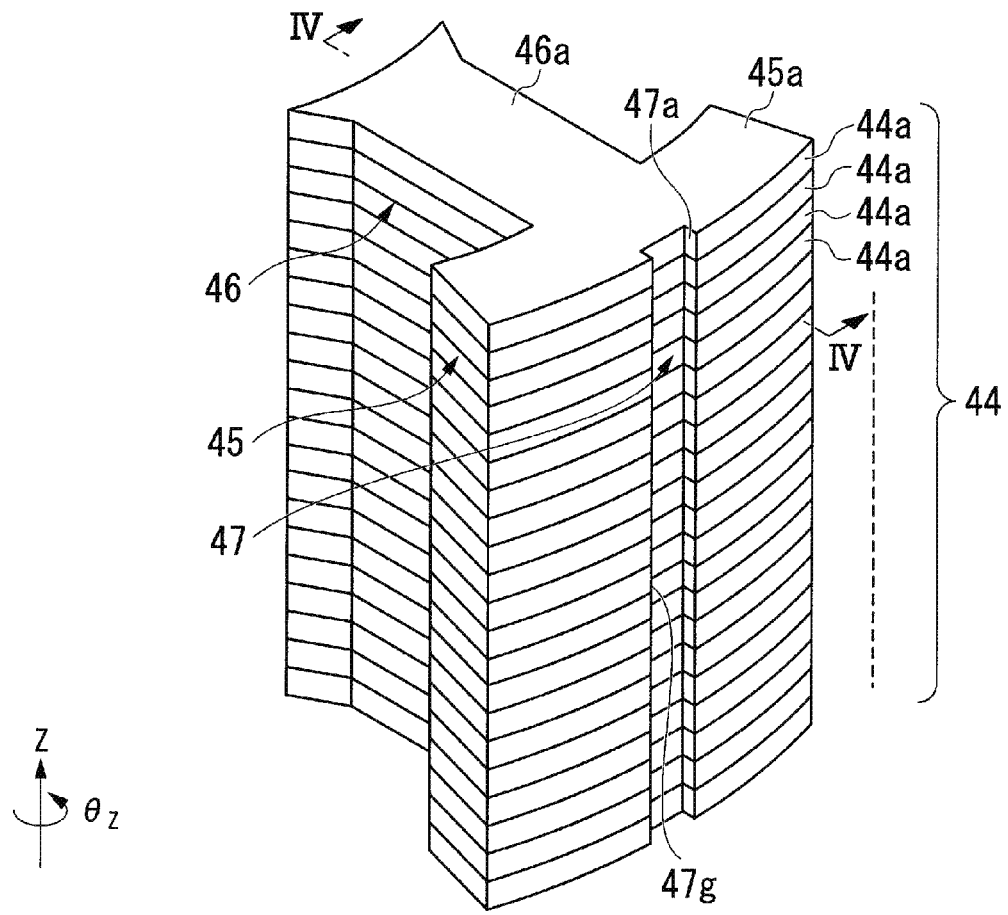
FIG. 3 is a perspective view illustrating a core piece of the present embodiment.

FIG. 3 is a perspective view illustrating a core piece 44. As illustrated in FIGS. 1 to 3, the core piece 44 includes a core back 45, a tooth 46, and a groove 47.

The core back 45 extends in the circumferential direction. An end portion of each core back 45 in the circumferential direction is connected to a core back 45 of an adjacent core piece 44 in the circumferential direction. With the above, the plurality of core backs 45 form an annular shape surrounding the rotor 30 in the circumferential direction. As illustrated in FIG. 1, the core backs 45 are fixed to the inner circumferential surface of the housing cylindrical portion 21. The teeth 46 extend from the core backs 45 towards the inner side in the radial direction. The insulator 42 and the coil 43 are mounted on the teeth 46.

As illustrated in FIG. 2, the grooves 47 are recessed from the outer sides of the core backs 45 in the radial direction towards the inner sides thereof in the radial direction. As illustrated in FIG. 3, the groove 47 is provided across the entire core piece 44 in the axial direction. The grooves 47 are tool engagement grooves to which a positioning tool is engaged, for example. The grooves 47 are used for positioning the plurality of core pieces 44 in the circumferential direction.

The plurality of core pieces 44 are each formed by stacking a plurality of plate members 44a. The plate members 44a are manufactured by punching an electromagnetic steel sheet. A method of manufacturing the plate members 44a will be described in detail later. As illustrated in FIG. 2, each plate member 44a includes a core back portion 45a, a tooth portion 46a, and a groove portion 47a.

As illustrated in FIG. 3, by stacking the plurality of plate members 44a, the core back 45 in which a plurality of core back portions 45a are stacked, the tooth 46 in which a plurality of tooth portions 46a are stacked, and the groove 47 in which a plurality of groove portions 47a are stacked are formed.

As illustrated in FIG. 2, the core back portions 45a extend in the circumferential direction. The tooth portions 46a extend from the core back portions 45a towards the inner side in the radial direction (a first side in the radial direction). The groove portions 47a are recessed from the outer sides (a second side in the radial direction) of the core back portions 45a in the radial direction toward the inner side in the radial direction.

In the present embodiment, the entire groove portions 47a overlap the tooth portions 46a in the radial direction. Accordingly, each groove 47 can be easily provided at the center of the corresponding core back 45 in the circumferential direction. With the above, the core pieces 44 can be positioned easily in the circumferential direction by using the grooves 47. Accordingly, as a result, the arrangement accuracy of the plurality of core pieces 44 in the circumferential direction can be improved and the distortion in the magnetic path generated in the stator core 41 can be suppressed. As a result, increases in the cogging torque and the torque ripple of the motor 10 can be suppressed.

In the present embodiment, the center of each groove portion 47a in the circumferential direction overlaps, in the radial direction, the center of the corresponding tooth portion 46a in the circumferential direction. In other words, the circumferential direction position of the center of each groove portion 47a in the circumferential direction is the same as the circumferential direction position of the center of the corresponding tooth portion 46a in the circumferential direction. Accordingly, each groove 47 can be provided at the center of the corresponding core back 45 in the circumferential direction. With the above, the core pieces 44 can be positioned more easily in the circumferential direction by using the grooves 47. Accordingly, as a result, the arrangement accuracy of the plurality of core pieces 44 in the circumferential direction can be improved further and the distortion in the magnetic path generated in the stator core 41 can be suppressed further. As a result, increases in the cogging torque and the torque ripple of the motor 10 can be suppressed.

The shape of each groove portion 47a in plan view is not limited in particular, and may be semicircular, semi-elliptical, triangular, square, or another polygonal shape. In the example in FIG. 2, the shape of each groove portion 47a in plan view is, for example, rectangular. Accordingly, fabrication of the groove portions 47a is facilitated. Furthermore, the shape of a member, for example, a positioning tool, that is engaged to the groove 47 constituted by the plurality of groove portions 47a can be made simple.

As illustrated in FIGS. 2 and 3, edge portions 47g of each groove portion 47a on the outer side in the radial direction (the second side in the radial direction) are angular corners. For example, in a case in which the entire plate member 44a is stamped out at once from an electromagnetic steel sheet, the edge portions of the outer side groove portion 47a in the radial direction have roundish shapes. On the other hand, in a case in which the portion other than the groove portion 47a of the plate member 44a and the groove portion 47a are stamped out at different stamping out steps, the edge portions 47g of the groove portion 47a can be made to have angular corners. Accordingly, in the present embodiment, since the edge portions 47g are angular corners, a method of manufacturing described later that forms the portions other than the groove portion 47a of the plate member 44a and the groove portion 47a in different stamping out steps can be employed. With the above, as a result, a decrease in the dimensional accuracy of the groove portion 47a can be suppressed.

Figure 4:
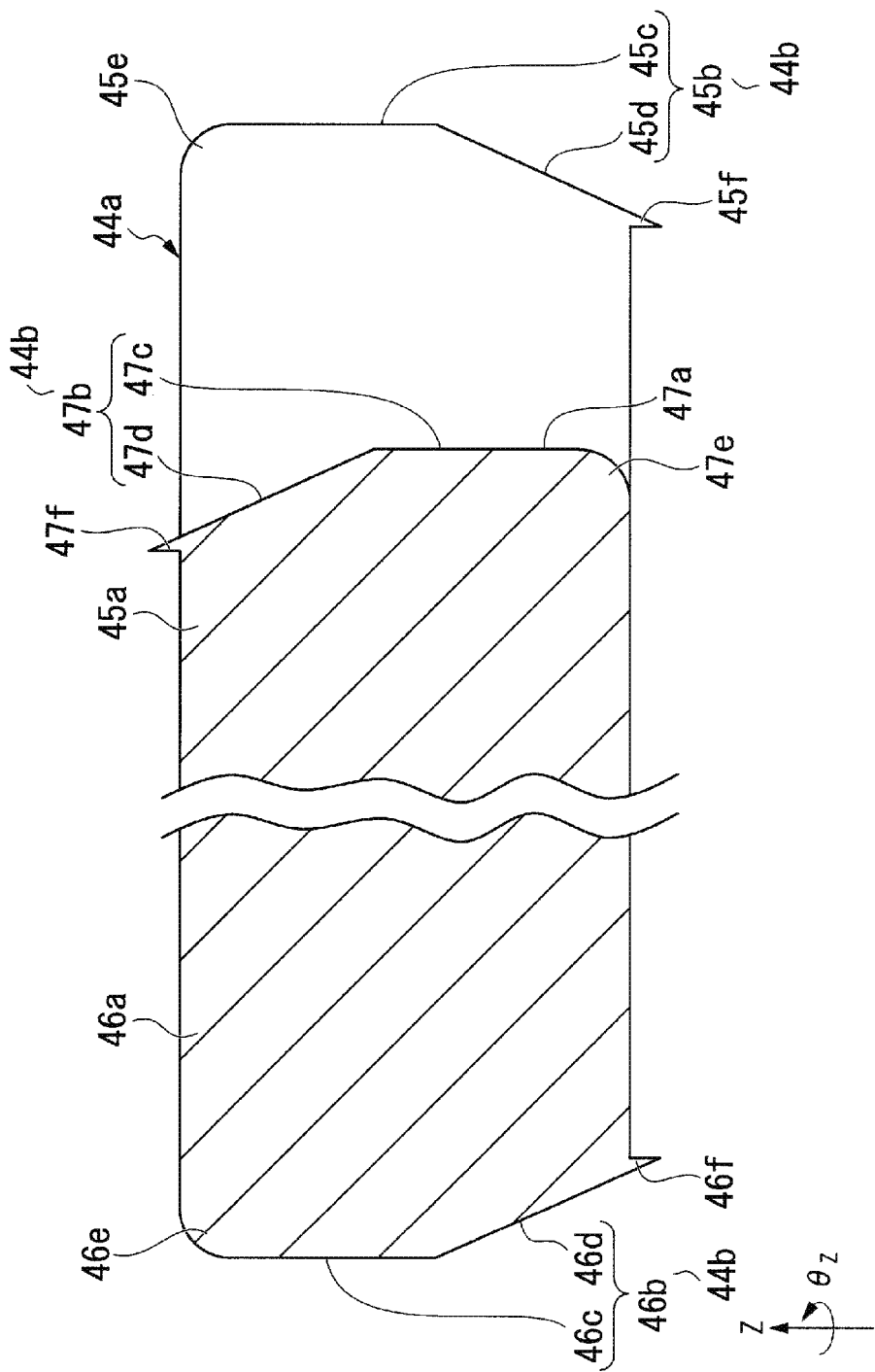
FIG. 4 is a drawing illustrating a plate member according to the present embodiment, and is a cross-sectional view taken along IV-IV in FIG. 3.

FIG. 4 is a drawing illustrating the plate member 44a, and is a cross-sectional view taken along IV-IV in FIG. 3. As illustrated in FIG. 4, plate member lateral surfaces 44b that are lateral surfaces of the plate member 44a each include a shear surface and a fracture surface along the axial direction. The plate member lateral surfaces 44b include a core back portion lateral surface 45b that is a lateral surface of the core back portion 45a, a tooth portion lateral surface 46b that is a lateral surface of the tooth portion 46a, and a groove portion inner lateral surface 47b that is an inner lateral surface of the groove portion 47a.

In other words, the core back portion lateral surface 45b includes a shear surface 45c and a fracture surface 45d in the axial direction. The tooth portion lateral surface 46b includes a shear surface 46c and a fracture surface 46d in the axial direction. The groove portion inner lateral surface 47b includes a shear surface 47c and a fracture surface 47d in the axial direction. The shear surfaces 45c, 46c, and 47c are surfaces that are parallel to the axis direction, for example. The fracture surfaces 45d, 46d, and 47d are surfaces that are inclined with respect to the axial direction.

In the core back portion lateral surface 45b, the shear surface 45c is positioned above the fracture surface 45d. In the tooth portion lateral surface 46b the shear surface 46c is positioned above the fracture surface 46d. In the groove portion inner lateral surface 47b, the shear surface 47c is positioned below the fracture surface 47d. In other words, among the plate member lateral surfaces 44b, in the inner lateral surface of the groove portion 47a, the shear surface 47c is positioned below the fracture surface 47d. Among the plate member lateral surfaces 44b, in the portions except for the inner lateral surface of the groove portion 47a, the shear surfaces 45c and 46c are positioned above the fracture surfaces 45d and 46d, respectively.

In a case in which a portion of an electromagnetic steel sheet is punched using a dye and a punch, for example, regarding the lateral surface of the portion stamped out from the electromagnetic steel sheet and the inner lateral surface of a hole created by stamping out a portion of the electromagnetic steel sheet, the positions of the shear surface and the fracture surface in the axial direction are upside down. In other words, for example, in the lateral surface of the portion stamped out from the electromagnetic steel sheet, the shear surface is positioned above the fracture surface, and in the inner lateral surface of the hole created by stamping out a portion of the electromagnetic steel sheet, the shear surface is positioned below the fracture surface.

For example, in a case in which the plate member is stamped out by a single stamping out step, since the entire plate member is a portion that is stamped out, the positions of the shear surface and the fracture surface in the axial direction are the same in the entire lateral surfaces of the plate member.

Conversely, according to the present embodiment, among the plate member lateral surfaces 44b, the positions of the shear surface and the fracture surface in the axial direction are upside down in the portions except for the inner lateral surface of the groove portion 47a, and the inner lateral surface of the groove portion 47a. Accordingly, the method of manufacturing described later that forms the portions other than the groove portion 47a of the plate member 44a and the groove portion 47a in different stamping out steps can be employed. With the above, a decrease in the dimensional accuracy of the groove portion 47a can be suppressed.

The core back portion lateral surface 45b, for example, includes a sag 45e and a burr 45f. The sag 45e is positioned at an end portion of core back portion lateral surface 45b on the upper side. In other words, the sag 45e is positioned on the upper side of the shear surface 45c. The sag 45e is a roundish portion in which the edge on the upper side of the core back portion 45a is smooth.

The burr 45f is positioned at an end portion of core back portion lateral surface 45b on the lower side. In other words, the burr 45f is positioned on the lower side of the fracture surface 45d. The burr 45f is a portion that projects downward.

The tooth portion lateral surface 46b, for example, includes a sag 46e and a burr 46f. The sag 46e is similar to the sag 45e of the core back portion lateral surface 45b. The burr 46f is similar to the burr 45f of the core back portion lateral surface 45b.

The groove portion inner lateral surface 47b, for example, includes a sag 47e and a burr 47f. The sag 47e is positioned at an end portion of the groove portion inner lateral surface 47b on the lower side. In other words, the sag 47e is positioned on the lower side of the shear surface 47c. The sag 47e is a roundish portion in which the edge on the lower side of the groove portion 47a is smooth.

The burr 47f is positioned at an end portion of the groove portion inner lateral surface 47b on the upper side. In other words, the burr 47f is positioned on the upper side of the fracture surface 47d. The burr 47f is a portion that projects upward.

The sags 45e, 46e, and 47e, and the burr 45f, 46f, and 47f, for example, are created in the lateral surface of the portion stamped out from the electromagnetic steel sheet, and the inner lateral surface of the hole created by stamping out a portion of the electromagnetic steel sheet. In such a case, the sag, the shear surface, the fracture surface, and the burr are, in that order in the axial direction, created in the lateral surface of the portion stamped out from the electromagnetic steel sheet, and in the inner lateral surface of the hole created by stamping out a portion of the electromagnetic steel sheet.

Note that in the present specification, the lateral surfaces of the plate member 44a include surfaces that intersect the surfaces, among the surfaces of the plate members, on which the plate members are stacked with respect to each other. The surfaces of the plate member 44a on which the plate members are stacked with respect to each other are, for example, surfaces that are orthogonal to the axial direction, in other words, are an upper surface and an undersurface of the plate member 44a. In other words, the lateral surfaces of the plate member 44a include, for example, the surfaces expect for the upper surface and the undersurface of the plate member 44a.

Figure 5:
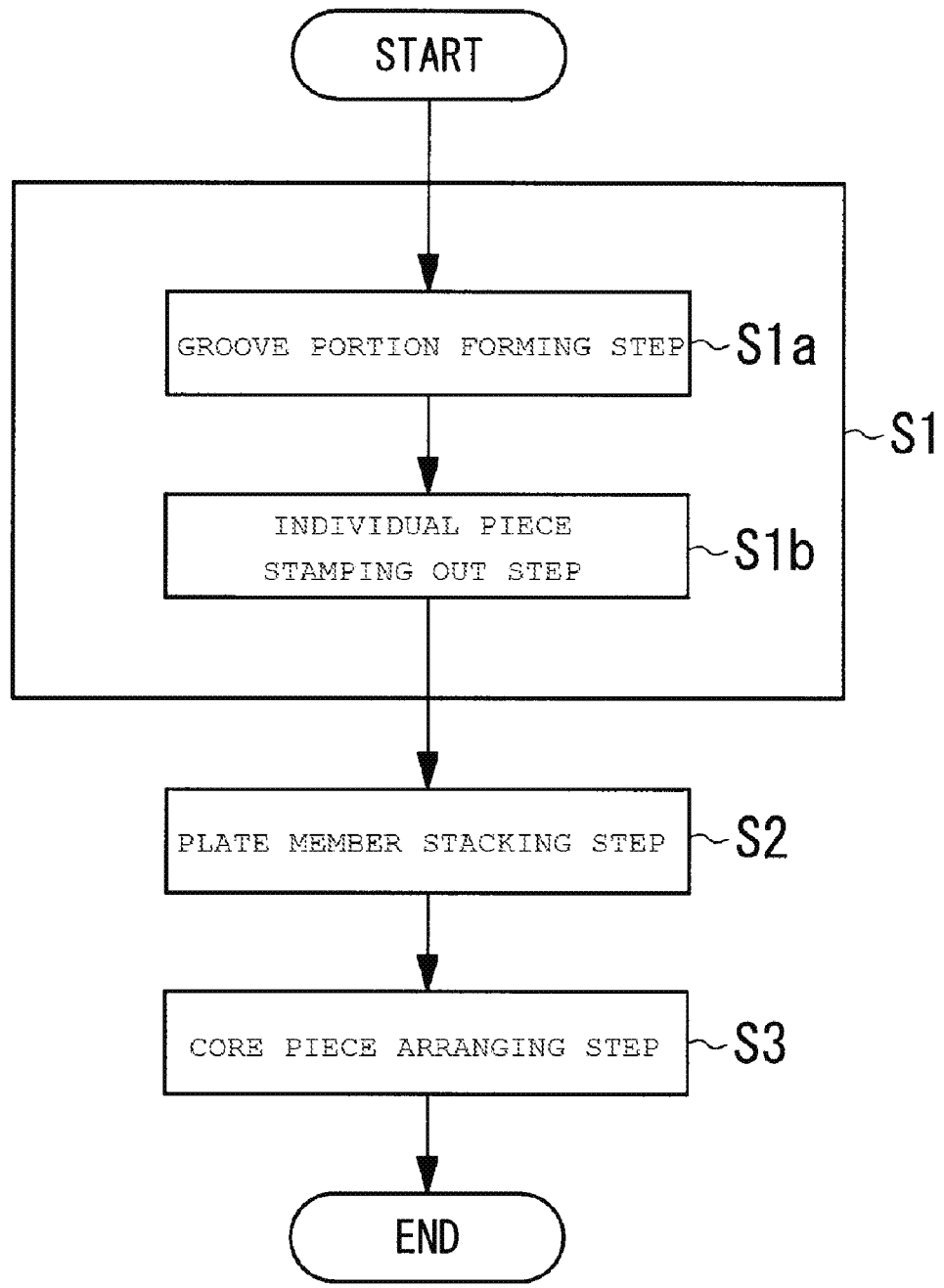
FIG. 5 is a flowchart illustrating a procedure of a method of manufacturing the stator core of the present embodiment.

FIG. 5 is a flowchart illustrating a procedure of a method of manufacturing the stator core 41 of the present embodiment. As illustrated in FIG. 5, the method of manufacturing the stator core 41 of the present embodiment includes plate member manufacturing step S1, plate member stacking step S2, and core piece arranging step S3.

Plate member manufacturing step S1 is a step of manufacturing the plate members 44a. Plate member manufacturing step S1 includes groove portion forming step S1a and individual piece stamping out step S1b. In other words, the method of manufacturing the stator core 41 of the present embodiment includes groove portion forming step S1a and individual piece stamping out step S1b. In plate member manufacturing step S1 of the present embodiment, groove portion forming step S1a and individual piece stamping out step S1b are performed is that order. In other words, in the present embodiment, individual piece stamping out step S1b is provided after groove portion forming step S1a.

Figure 6:
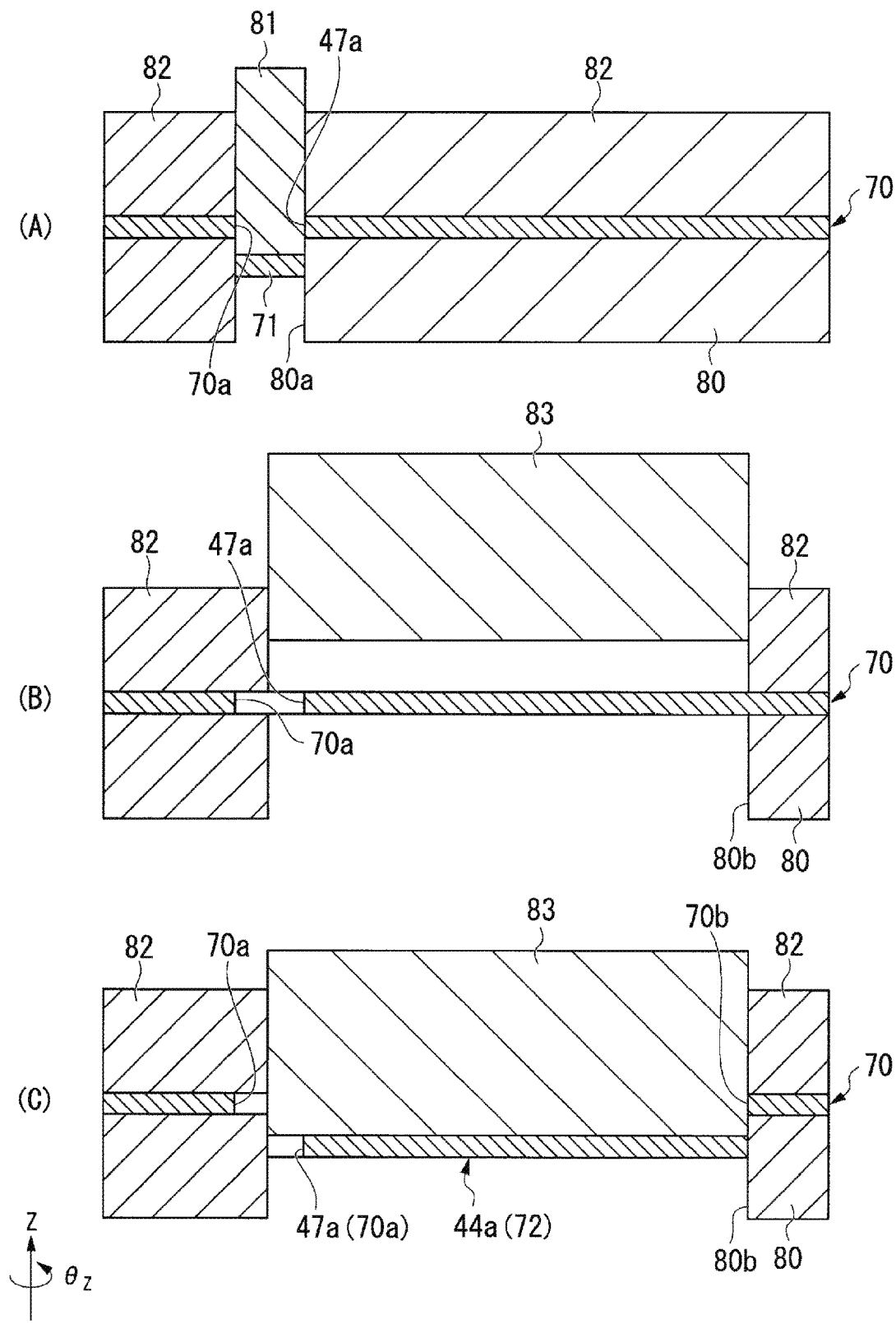
FIG. 6 illustrates cross-sectional views illustrating a portion of the procedure of the method of manufacturing the stator core of the present embodiment.
Figure 7:
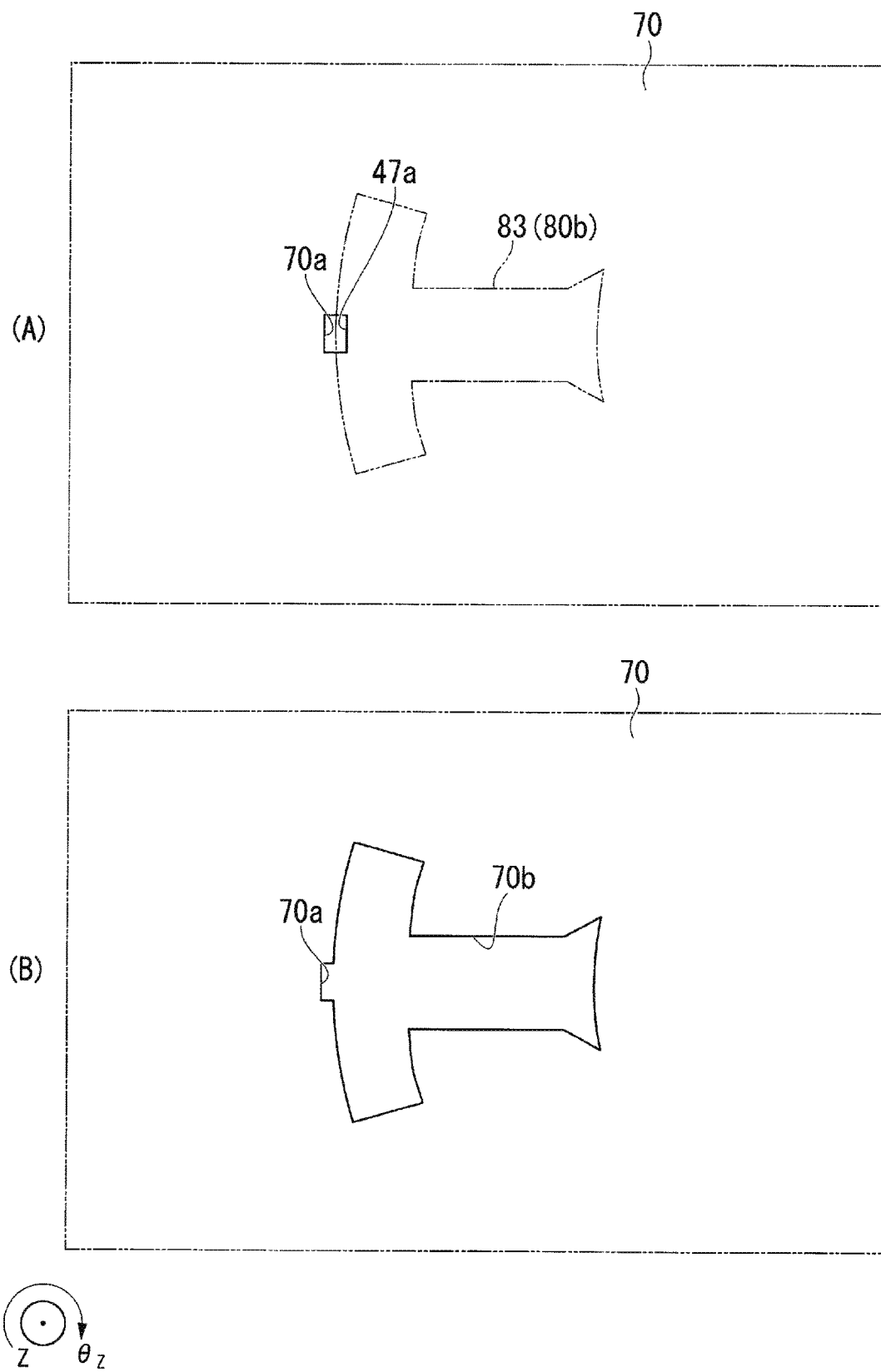
FIG. 7 illustrates plan views illustrating a portion of the procedure of the method of manufacturing the stator core of the present embodiment.

FIGS. 6(A) to 6(C) and FIGS. 7(A) and (B) are cross-sectional views illustrating a portion of the procedure of plate member manufacturing step S1. FIG. 6(A) is a drawing illustrating groove portion forming step S1a. FIGS. 6(B) and 6(C) are drawings illustrating individual piece stamping out step S1b. FIG. 7(A) is a plan view illustrating an electromagnetic steel sheet 70 after completion of groove portion forming step S1a. FIG. 7(B) is a plan view illustrating the electromagnetic steel sheet 70 after completion of individual piece stamping out step S1b.

As illustrated in FIGS. 6(A) to 6(C), in plate member manufacturing step S1 of the present embodiment, punches 81 and 83 and a die 80 are used to punch the electromagnetic steel sheet 70 to manufacture the plate member 44a. In other words, individual piece stamping out step S1b and groove portion forming step S1a are stamping out steps using the punches 81 and 83 and the die 80. The die 80 is a progressive die, for example.

As illustrated in FIG. 6(A), groove portion forming step S1a is a step that forms a groove portion 47a by punching the portion of the electromagnetic steel sheet 70. The electromagnetic steel sheet 70 is first disposed on an upper surface of the die 80. Subsequently, a pressing member 82 is disposed on the upper surface of the electromagnetic steel sheet 70, and the electromagnetic steel sheet 70 is sandwiched between the die 80 and the pressing member 82.

Subsequently, the punch 81 is passed through a first punching hole 80a of the die 80 to stamp out a removed individual piece 71 that is a portion of the electromagnetic steel sheet 70. With the above, a hole portion 70a is formed in the electromagnetic steel sheet 70. The hole portion 70a includes the groove portion 47a. In other words, in groove portion forming step S1a of the present embodiment, a portion of the electromagnetic steel sheet 70 is punched to form the hole portion 70a including the groove portion 47a in the electromagnetic steel sheet 70.

As illustrated in FIG. 7(A), the shape of the hole portion 70a in plan view is, for example, rectangular. In other words, the shape of the first punching hole 80a in plan view and the shape of the punch 81 in plan view are, for example, rectangular. Note that the shape of the hole portion 70a in plan view, the shape of the first punching hole 80a in plan view, and the shape of the punch 81 in plan view are not limited in particular as long as the groove portion 47a can be formed.

As illustrated in FIGS. 6(B) and 6(C), individual piece stamping out step S1b is a step of stamping out an individual piece 72 including the core back portion 45a and the tooth portion 46a from the electromagnetic steel sheet 70. As illustrated in FIGS. 6(B) and 7(A), first, the electromagnetic steel sheet 70 is disposed at a position in which an inner edge of a second punching hole 80b of the die 80 in the upper surface of the die 80 overlaps the hole portion 70a in the axial direction.

In the present embodiment, since the die 80 is a progressive die, after groove portion forming step S1a has been completed, the electromagnetic steel sheet 70 is automatically sent to a predetermined position, in other words, is sent to a position in which the inner edge of the second punching hole 80b overlaps the hole portion 70a in the axial direction.

Subsequently, the pressing member 82 is disposed on the upper surface of the electromagnetic steel sheet 70, and the electromagnetic steel sheet 70 is sandwiched between the die 80 and the pressing member 82. Subsequently, a punch 83 is passed through the second punching hole 80b to stamp out the individual piece 72 that is a portion of the electromagnetic steel sheet 70. As illustrated in FIG. 7(A), the shape of the second punching hole 80b in plan view and the shape of the punch 83 in plan view are the same as the shape in which the groove portion 47a has been removed from the plate member 44a. In plan view, an outer peripheral shape of the punch 83 overlaps the hole portion 70a.

The individual piece 72 includes the groove portion 47a that is a portion of the hole portion 70a. In other words, in individual piece stamping out step S1b of the present embodiment, the individual piece 72 including a portion of the hole portion 70a in the electromagnetic steel sheet 70 is stamped out. The individual piece 72 in the present exemplary embodiment is the plate member 44a. Note that as illustrated in FIG. 7(B), the other portion of the hole portion 70a is left in the electromagnetic steel sheet 70 together with a punching hole portion 70b created when the individual piece 72 is stamped out.

With the above, the plate member manufacturing step S1 is ended and the plate member 44a is manufactured.

The present embodiment is capable of suppressing decrease in the dimensional accuracy of the groove portion 47a that is used for positioning. Hereinafter, the details will be described.

For example, in a stamping step using a punch and a die, since there is a clearance between a blade of the punch and a blade of the die, the blade that determines the size is different between the portion stamped out from the electromagnetic steel sheet 70 and the hole portion created by stamping out a portion of the electromagnetic steel sheet 70. In other words, the size of the portion stamped out from the electromagnetic steel sheet 70 is determined by the blade of the die, in other words, by the size of the punching hole of the die. The size of the hole portion created by stamping out a portion of the electromagnetic steel sheet 70 is determined by the blade of the punch, in other words, by the size of the punch.

Note that in the present specification, a case in which a size of a predetermined object formed by a stamping out step is determined by the size of the blade of the die is expressed as forming a predetermined object using the blade of the die. Furthermore, in the present specification, a case in which a size of a predetermined object formed by a stamping out step is determined by the size of the blade of the punch is expressed as forming using the blade of the punch.

For example, in groove portion forming step S1a described above, the groove portion 47a is formed by the punch 81 and the first punching hole 80a. In such a case, since the groove portion 47a is a portion of the hole portion created by stamping out a portion of the electromagnetic steel sheet 70, the size of the groove portion 47a is determined by the size of the blade of the punch 81. In other words, in groove portion forming step S1a of the present embodiment, the groove portion 47a is formed using the blade of the punch 81.

Furthermore, for example, in individual piece stamping out step S1b described above, the individual piece 72 is formed by the punch 83 and the second punching hole 80b. In such a case, since the individual piece 72 is the portion stamped out from the electromagnetic steel sheet 70, the size of the individual piece 72 is determined by the size of the blade of the die 80. In other words, in individual piece stamping out step S1b of the present embodiment, the individual piece 72 is formed using the blade of the die 80.

The blade of the punch and the blade of the die become worn each time the electromagnetic steel sheet 70 is punched. Accordingly, the blade of the punch and the blade of the die need to be sharpened on a regular basis. Note that in order to have the portion that has been stamped drop down, an inclination from the lower side towards the upper side inclined towards the outside of the punching hole of the die is given to the blade of the die. Accordingly, the position of the blade of the die gradually changes towards the outside each time the blade of the die is sharpened and, as a result, the size of the blade of the die becomes larger. On the other hand, since the blade of the punch has a straight shape in the up-down direction, the size does not change even when sharpened again and again.

For example, in a case in which the entire plate member 44a is stamped out from the electromagnetic steel sheet 70 with a single stamping out step, the entire plate member 44a including the outer peripheral shape of the groove portion 47a is the portion stamped out from the electromagnetic steel sheet 70. Accordingly, the core back portion 45a, the tooth portion 46a, and the groove portion 47a are all formed using the blade of the die. In other words, the size of the groove portion 47a is determined by the size of the blade of the die. With the above, as the blade of the die is sharpened and the size thereof is increased, the size of the groove portion 47a becomes larger and the dimensional accuracy of the groove portion 47a becomes lower. Accordingly, the dimensional accuracy of the groove 47 of the core piece 44 constituted by stacking the groove portions 47a is decreased.

The grooves 47 are used as tool engagement grooves of the positioning tool when the plurality of core pieces 44 are arranged in an annular shape. In other words, the plurality of core pieces 44 are arranged in an annular shape with the grooves 47 as references. Accordingly, if the dimensional accuracy of the groove 47 is low, the arrangement accuracy of the core pieces 44 in the circumferential direction becomes low. As a result, there are problems in that the magnetic path generated in the stator core 41 becomes distorted, and the cogging torque and the torque ripple of the motor 10 become large.

Conversely, the present embodiment includes two stamping out steps, namely, groove portion forming step S1a and individual piece stamping out step S1b, and in groove portion forming step S1a, the groove portion 47a is formed by punching a portion of the electromagnetic steel sheet 70. Accordingly, in groove portion forming step S1a, a processing method of forming the groove portion 47a using the blade of the punch 81 can be employed, for example. In other words, the size of the groove portion 47a can be determined by the size of the blade of the punch 81. With the above, according to the present embodiment, even if the size of the blade of the die 80 changes, a decrease in the dimensional accuracy of the groove portion 47a can be suppressed. As a result, the present embodiment can suppress the cogging torque and the torque ripple of the motor 10 from increasing.

Furthermore, for example, even in a case in which the entire plate member 44a is stamped out from the electromagnetic steel sheet 70, by replacing the blade of the die with a new one on a regular basis, a decrease in the dimensional accuracy of the groove portion 47a can be suppressed. However, when replacing the blade of the die, since the entire die needs to be replaced, cost increases. According to the present embodiment, since the decrease in dimensional accuracy of the groove portion 47*a* can be suppressed without replacing the blade of the die, increase in cost can be suppressed.

Furthermore, for example, by stamping out, from the electromagnetic steel sheet 70, a frame shaped portion in which the inner edge thereof has the outer peripheral shape of the plate member 44*a*, the portion that has been stamped out remaining inside the frame shaped portion can be the plate member 44*a*. In such a case, the inner edge of the hole portion created by stamping out a portion from the electromagnetic steel sheet 70 becomes the outer peripheral shape of the plate member 44*a*. In other words, with the above method, the plate member 44*a* can be formed using the blade of the punch. Accordingly, a decrease in the dimensional accuracy of the groove portion 47*a* can be suppressed. However, since the shape of the plate member 44*a* is not a simple shape, such as a square shape or a round shape, it is difficult to fabricate a punch that punches through the frame shape in which the inner edge thereof has the outer peripheral shape of the plate member 44*a*.

Conversely, according to the present embodiment, in individual piece stamping out step S1*b*, the portions other than the groove portion 47*a*, in other words, the individual piece 72 including the core back portion 45*a* and the tooth portion 46*a*, is stamped out from the electromagnetic steel sheet 70. Accordingly, the individual piece 72 is formed using the blade of the die 80. With the above, according to the present embodiment, a decrease in the dimensional accuracy of the groove portion 47*a* can be suppressed while the punches 81 and 83 are formed in simple shapes.

As described above, according to the present embodiment, by forming the groove portion 47*a* and the individual piece 72 using the blades of the punches 81 and 82, respectively, and the blade of the die 80, the plate member 44*a* having an excellent dimensional accuracy in the groove portion 47*a* can be easily manufactured at a low cost.

Furthermore, for example, in a case in which individual piece stamping out step S1*b* is provided before groove portion forming step S1*a*, the area to hold the individual piece that has been stamped out in individual piece stamping out step S1*b* is small. Accordingly, in groove portion forming step S1*a*, there are cases in which it is difficult to hold the individual piece in a stable manner, and in which it is difficult to form the groove portion 47*a* with good positional accuracy. Due to the above, the position of the groove portion 47*a* tends to become varied in each plate member 44*a* and, as a result, the magnetic path generated in the stator core 41 tends to become distorted. Furthermore, a manufacturing apparatus of the plate members 44*a* tends to become complex and the cost tends to become large.

Conversely, according to the present embodiment, individual piece stamping out step S1*b* is provided after groove portion forming step S1*a*. Accordingly, in groove portion forming step S1*a* and individual piece stamping out step S1*b*, the electromagnetic steel sheet 70 can be held easily and in a stable manner with the pressing member 82 and the die 80. With the above, the groove portion 47*a* can be formed with good positional accuracy. As a result, distortion in the magnetic path generated in the stator core 41 can be suppressed. Furthermore, the manufacturing apparatus of the plate members 44*a* can be prevented from becoming complex.

Furthermore, according to the present embodiment, since individual piece stamping out step S1*b* is provided after groove portion forming step S1*a*, in individual piece stamping out step S1*b*, the stamping out of the individual piece 72 can be performed with the groove portion 47*a* as a reference.

As described above, according to the present embodiment, a decrease in the dimensional accuracy of the groove portion 47*a* can be suppressed. Accordingly, by having the groove portion 47*a* as a reference, the positional accuracy of the groove portion 47*a* in the plate member 44*a* can be improved.

Plate member stacking step S2 is a step of stacking a plurality of plate members 44*a*. With the above step, the core piece 44 illustrated in FIG. 3 can be formed.

Core piece arranging step S3 is a step of arranging a plurality of core pieces 44 in the circumferential direction. When the plurality of core pieces 44 are arranged, for example, the grooves 47 are used as the tool engagement grooves of the positioning tool. With the above, the core pieces 44 can be arranged in the circumferential direction with good accuracy.

The stator core 41 of the present embodiment is manufactured with plate member manufacturing step S1, plate member stacking step S2, and core piece arranging step S3 described above.

Note that in the present embodiment, the following configurations and methods may be employed.

In the present embodiment, a step of inspecting the size of the plate member 44*a* may be provided after plate member manufacturing step S1 and before plate member stacking step S2. In the above step, the size of the plate member 44*a* is measured with the size of the groove portion 47*a* serving as a reference. In other words, the method of inspecting the stator core 41 manufactured using the method of manufacturing the stator core described above includes a method of measuring the size of the plate member 44*a* with the size of the groove portion 47*a* serve as a reference.

For example, in a case in which the entire plate member 44*a* is stamped out from the electromagnetic steel sheet 70, when the size of the blade of the die becomes large, the size of the entire plate member 44*a* including the groove portion 47*a* becomes large. In such a case, since there is no measurement that can serve as a reference in the plate member 44*a*, it is difficult to accurately determine the amount of change in the size of the entire plate member 44*a*. In the above, there is a concern that a defective unit having a size that is larger than the specified value may be mixed in the plate members 44*a* constituting the core piece 44.

Conversely, according to the present embodiment, since a change in the size of the groove portion 47*a* can be suppressed, by having the size of the groove portion 47*a* serve as a reference, an accurate determination of the amount of change in the size of the entire plate member 44*a* is facilitated. With the above, the configuration described above allows the manufactured plate members 44*a* to be accurately separated into non-defective units and defective units by providing a step of measuring the size of the plate member 44*a*, as a method of inspecting the stator core 41, while having the size of the groove portion 47*a* serve as a reference. Accordingly, by forming the core piece 44 with the plate members 44*a* that has been determined to be non-defective units, variations in the dimensional accuracy of the core pieces 44 can be suppressed. As a result, variations in the characteristics of the motor 10 can be suppressed.

Furthermore, according to the above configuration, since the size of the plate member 44*a* can be measured accurately, the change in the size of the blade of the die 80 can be determined more accurately. Accordingly, the time to replace the die 80 can be determined in an appropriate manner.

Furthermore, in individual piece stamping out step S1b of the present embodiment, a method of stamping out the individual piece 72 including at least a portion of the hole portion 70a in the electromagnetic steel sheet 70 can be employed. In other words, in individual piece stamping out step S1b of the present embodiment, the individual piece 72 including the entire hole portion 70a in the electromagnetic steel sheet 70 may be stamped out. In such a case, the entire hole portion 70a formed in groove portion forming step S1a becomes the groove portion 47a.

Furthermore, in the present embodiment, groove portion forming step S1a may be provided after individual piece stamping out step S1b. In such a case, a portion of the electromagnetic steel sheet 70 stamped out in groove portion forming step S1a is a portion of the individual piece (the electromagnetic steel sheet) stamped out in individual piece stamping out step S1b.

Furthermore, the present embodiment can employ a configuration in which at least a portion of the groove portion 47a overlaps the tooth portion 46a in the radial direction. In other words, in the present embodiment, only a portion of the groove portion 47a may overlap the tooth portion 46a in the radial direction.

Furthermore, in the present embodiment, the specified methods of groove portion forming step S1a and individual piece stamping out step S1b are not limited in particular. In other words, in groove portion forming step S1a, as long as the groove portion 47a can be formed by punching a portion of the electromagnetic steel sheet 70, a portion of the electromagnetic steel sheet 70 can be punched with any kind of method. In individual piece stamping out step S1b, as long as the individual piece 72 including the core back portion 45a and the tooth portion 46a can be stamped out from the electromagnetic steel sheet 70, the individual piece 72 may be stamped out with any kind of method.

Furthermore, in the description described above, the stator core 41 is formed of split cores; however, the stator core 41 is not limited to split cores. In the present embodiment, the stator core 41 may be a straight core in which a plurality of core pieces 44 are connected to each other. In such a case, a plate member in which a plurality of plate members 44a are connected are manufactured by punching the electromagnetic steel sheet 70, and the connected plate members are stacked to manufacture the member in which a plurality of core pieces 44 are connected to each other. Furthermore, the member in which the plurality of core pieces 44 are connected to each other is folded into an annular shape to manufacture the stator core 41.

When folding the member, in which the plurality of core pieces 44 are connected to each other, into an annular shape, for example, the core pieces 44 are each sequentially positioned by using the grooves 47. In the above, if the dimensional accuracy of the groove 47 is low, the arrangement accuracy of each core piece 44 in the circumferential direction becomes low. With the above, there is a concern in that the magnetic path generated in the stator core 41 becomes distorted, and the cogging torque and the torque ripple of the motor 10 become large.

Conversely, according to the present embodiment, as described above, since the decrease in the dimensional accuracy of the groove 47 is suppressed, even in a case in which the stator core 41 is a straight core, a decrease in the arrangement accuracy of each core piece 44 can be suppressed. With the above, distortion in the magnetic path generated in the stator core 41 can be suppressed, and increase in the cogging torque and the torque ripple of the motor 10 can be suppressed.

Note that in a case in which the stator core 41 is a straight core, for example, the stator core 41 is a single member. In other words, the plurality of core pieces 44 are each, for example, a portion of a single member.

Note that the motor to which the present invention is applied is not limited in particular. In the embodiment described above, the motor 10 is an inner rotor motor; however, the present invention may be applied to an outer rotor motor, for example. In a case of an outer rotor motor, the groove portion 47a of the plate member 44a, for example, is recessed from a surface of the core back portion 45a on the inner side in the radial direction towards the outer side in the radial direction.

An exemplary embodiment of the present invention has been described above; however, the present invention is not limited to the embodiment described above.

Figure 8:
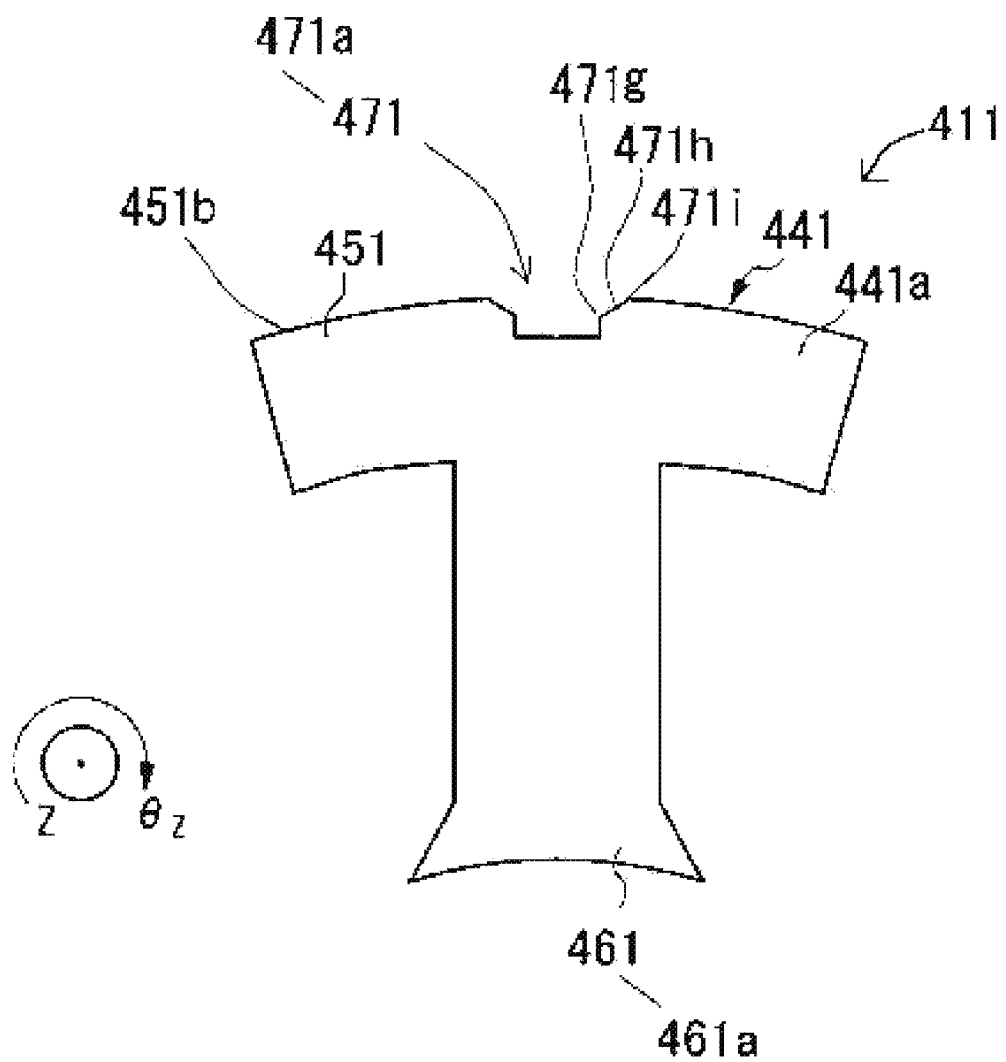
FIG. 8 is a plan view illustrating a core piece of a modification.

FIG. 8 is a plan view of a stator core 411 that is a modification. In the example in FIG. 8, in the radial direction, an opening of a groove 471 becomes larger towards the outer side in the radial direction. In other words, the stator core 411 includes a plurality of core pieces 441, the core pieces 441 are formed by stacking a plurality of plate members 441a, and the plate members 441a include enlarged portions 471h that enlarge the openings of the groove portions 471a. As the enlarged portions 471h extend towards the outside, the opening is enlarged. Accordingly, an assembling tool can be inserted into the groove 471 easily when the core pieces 441a are arranged in an annular manner after the core pieces 441a have been formed by stacking the plate members 441a. Specifically, since the opening portion of the groove 471 is inclined so that the opening portion is enlarged towards the outside, the insertion of the assembling tool is facilitated.

Furthermore, in the exemplary embodiment described above, there is a concern that burrs may be created in the edge portions 47g. The above is because a burr is easily created in the portions where a section stamped out in groove portion forming step S1a and a section stamped out in individual piece stamping out step S1b intersect each other.

In the modification in FIG. 8, the plate member 441a includes first edge portions 471g on the inner sides of the enlarged portion 471h in the radial direction, and second edge portions 471i on the outer sides of the enlarged portion 471h in the radial direction. Note that the enlarged portion 471h is formed by punching in individual piece stamping out step S1b. Accordingly, in the modification in FIG. 8, the portions where the section stamped out in groove portion forming step S1a and the section stamped out in individual piece stamping out step S1b intersect each other are the first edge portions 471g. However, since the first edge portions 471g are formed on the inner side with respect to the core back portion lateral surface 451b, there is less concern, such as contact with the housing when installing the motor.

Furthermore, in the modification in FIG. 8, the second edge portions 471i are created as well in the portion where the enlarged portions 471h and the core back portion lateral surface 451b intersect each other. However, since the second edge portions 471i are portions where the section stamped out in the same individual piece stamping out step S1b intersect, there is less concern of a burr being created.

Furthermore, since the second edge portions 471i are portions where the section stamped out in individual piece stamping out step S1b intersect, the second edge portions 471i may be formed to have an arc shape. If the second edge portions 471i are arc-shaped, there is even more less concern of a burr being created.

Each of the configurations described above may be appropriately combined as long as there is no contradiction among the configurations.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method of manufacturing a stator core that includes a plurality of core pieces arranged in a circumferential direction about a central axis, serving as a center, that extends in an up-down direction, the plurality of core pieces formed by stacking a plurality of plate members, the plate members each including a core back portion that extends in the circumferential direction, a tooth portion that extends from the core back portion towards a first side in a radial direction, and a groove portion that is recessed from a surface on a second side of the core back portion in the radial direction towards the first side in the radial direction, the method of manufacturing the stator core comprising:
   stamping out an individual piece, in which the individual piece including the core back portion and the tooth portion is stamped out from an electromagnetic steel sheet; and
   forming the groove portion, in which the groove portion is formed by punching a portion of the electromagnetic steel sheet; wherein
   plate member lateral surfaces of each of the plate members include a shear surface and a fracture surface in an axial direction;
   among the plate member lateral surfaces, in an inner lateral surface of the groove portion in the radial direction, the shear surface is positioned axially below the fracture surface; and
   among the plate member lateral surfaces, in portions other than the inner lateral surface of the groove portion, the shear surface is positioned axially above the fracture surface.

2. The method of manufacturing the stator core according to claim 1, wherein at least a portion of the groove portion overlaps the tooth portion in the radial direction.

3. The method of manufacturing the stator core according to claim 2, wherein a center of the groove portion in the circumferential direction and a center of the tooth portion in the circumferential direction overlap each other in the radial direction.

4. The method of manufacturing the stator core according to claim 1,
   wherein the stamping out the individual piece and the forming the groove portion are stamping using a punch and a die,
   wherein in the stamping out the individual piece, the individual piece is formed by using a blade of the die, and
   wherein in the forming the groove portion, the groove portion is formed using a blade of the punch.

5. The method of manufacturing the stator core according to claim 1,
   wherein the stamping out the individual piece is provided after the forming the groove portion.

6. The method of manufacturing the stator core according to claim 5,
   wherein in the forming the groove portion, a portion of the electromagnetic steel sheet is punched to form a hole portion including the groove portion in the electromagnetic steel sheet, and
   wherein in the stamping the individual piece, the individual piece that includes at least a portion of the hole portion in the electromagnetic steel sheet is stamped out.

7. The method of manufacturing the stator core according to claim 1,
   a shape of the groove portion in plan view is rectangular.

8. A method of inspecting the stator core manufactured by the method of manufacturing the stator core according to claim 1, the method of inspecting the stator core comprising:
   measuring a size of the plate members with a size of the groove portion as a reference.

9. The method of manufacturing the stator core according to claim 1, wherein an edge portion of the groove portion on the second side in the radial direction is an angular corner.

10. The method of manufacturing the stator core according to claim 1,
    wherein each plate member includes an enlarged portion that enlarges an opening of the groove portion, the plate member including a first edge portion on an inner side of the enlarged portion in the radial direction, and a second edge portion on an outer side of the enlarged portion in the radial direction, and
    wherein the first edge portion is positioned on the inner side in the radial direction with respect to a lateral surface on the outer side of the core back in the radial direction.

11. The method of manufacturing the stator core according to claim 10, wherein the enlarged portion is formed by being stamped out in the stamping out the individual piece.

12. The method of manufacturing the stator core according to claim 10, wherein the second edge portion has an arc shape.

13. A motor comprising:
    a stator including the stator core made using the method according to claim 1,
    a rotor including a shaft having the central axis as a center, and
    a bearing that supports the shaft.

14. A stator core, comprising:
    a plurality of core pieces arranged in a circumferential direction about a central axis, serving as a center, that extends in an up-down direction, the plurality of core pieces defined by stacking a plurality of plate members, the plate members each including a core back portion that extends in the circumferential direction, a tooth portion that extends from the core back portion towards a first side in a radial direction, and a groove portion that is recessed from a surface on a second side of the core back portion in the radial direction towards the first side in the radial direction; wherein
    plate member lateral surfaces of each of the plate members include a shear surface and a fracture surface in an axial direction;
    among the plate member lateral surfaces, in an inner lateral surface of the groove portion in the radial direction, the shear surface is positioned axially below the fracture surface; and
    among the plate member lateral surfaces, in portions other than the inner lateral surface of the groove portion, the shear surface is positioned axially above the fracture surface.

15. The stator core according to claim 14, wherein at least a portion of the groove portion overlaps the tooth portion in the radial direction.

16. The stator core according to claim 15, wherein a center of the groove portion in the circumferential direction and a center of the tooth portion in the circumferential direction overlap each other in the radial direction.

17. The stator core according to claim 14, wherein an edge portion of the groove portion on the second side in the radial direction is an angular corner.

18. The stator core according to claim 14,
wherein each plate member includes an enlarged portion that enlarges an opening of the groove portion, the plate member including a first edge portion on an inner side of the enlarged portion in the radial direction, and a second edge portion on an outer side of the enlarged portion in the radial direction, and
wherein the first edge portion is positioned on the inner side in the radial direction with respect to a lateral surface on the outer side of the core back in the radial direction.

19. The stator core according to claim 18, wherein the enlarged portion is formed by being stamped out in the stamping out the individual piece.

20. The stator core according to claim 18, wherein the second edge portion has an arc shape.

* * * * *